United States Patent [19]
Stewart et al.

[11] Patent Number: 5,898,436
[45] Date of Patent: Apr. 27, 1999

[54] GRAPHICAL USER INTERFACE FOR DIGITAL IMAGE EDITING

[75] Inventors: William Edward Stewart, Poway; Melissa Lee Monty; Wade Patrick Mears, both of San Diego; Adelaida Escobedo, Bonita; Charles Chi Jia; James Xin-Ping Zheng, both of San Diego, all of Calif.

[73] Assignee: Hewlett-Packard Company, Palo Alto, Calif.

[21] Appl. No.: 08/986,057

[22] Filed: Dec. 5, 1997

[51] Int. Cl.$^6$ .................................. G06F 3/00; G06F 3/14
[52] U.S. Cl. ........................ 345/354; 345/346; 345/348; 345/431; 345/432
[58] Field of Search .................................... 345/334, 340, 345/346, 348, 354, 429, 431, 432, 150, 147

[56] References Cited

U.S. PATENT DOCUMENTS

| | | | |
|---|---|---|---|
| 4,837,613 | 6/1989 | Paxton et al. | 358/515 |
| 5,146,346 | 9/1992 | Knoll | 358/298 |
| 5,270,806 | 12/1993 | Venable et al. | 358/500 |
| 5,424,754 | 6/1995 | Bar et al. | 345/150 |
| 5,499,325 | 3/1996 | Dugan, Jr. | 345/432 |
| 5,506,946 | 4/1996 | Bar et al. | 345/431 |
| 5,546,528 | 8/1996 | Johnston | 345/344 |
| 5,739,809 | 4/1998 | McLaughlin et al. | 345/150 |

OTHER PUBLICATIONS

"Adobe Photoshop 2.5 for Windows", Adobe Systems Incorporated, pp. 33–43, 1993.
"Adobe Systems Introduces Adobe Photoshop 4.0, New Version of Industry–Leading Image–Editing Tool", Adobe Systems Incorporated, pp. 1–6, Sep. 9, 1996.
Chris Lehan, "Quick color fixes", Macworld vol. 14 No. 12, pp. 1–3, Dec. 1997.
William Harrel, "Easy Image Editing", Windows Magazine No.409, pp. 1–2, 1993.
Sheryl Canter, "The 1997 PC Magazine shareware awards", PC Mgazine vol. 16 No. 16, p. 219 (5), Sep. 23, 1997.
Bruce Fraser, "Adobe sharpens interface, compositing in Photoshop 4", MacWeek vol. 10 No. 1, p. 49 (2), Jan. 6, 1997.

*Primary Examiner*—Raymond J. Bayerl
*Assistant Examiner*—X. L. Bautista

[57] ABSTRACT

Chromatic adjustments to the overall color balance of the image are presented on one screen and tonal adjustments (such as brightness or contrast) that do not affect the overall color balance are presented on another screen. The chromatic adjustments include at least three independent variables each of which can be separately increased or decreased, while the tonal adjustments include brightness and contrast that can be separately increased or decreased. Such a grouping concentrates the user's attention on only two or three adjustments related to a single readily identifiable deficiency in the original image, and thus not only facilitates image improvement but also makes it easier to selectively undo the effects of some adjustments but not others. Each adjustment is displayed as a pair of preview images which respectively show the effect of a one step increment or decrement of the associated variable. Each pair of preview images are clearly separated from all other images on the same screen and are displayed as two adjacent "buttons" either of which can be actuated by the user to effect the displayed result. The step size is adjustable by means of a single slider control that is effective for all the adjustments on that screen Each image adjustment screen includes thumbnail images corresponding to the original image and to the revised image. The thumbnail revised image is the largest image on the screen and is the focal point of attention for the user.

12 Claims, 4 Drawing Sheets

GRAPHICAL USER INTERFACE FOR DIGITAL IMAGE EDITING

FIELD OF THE INVENTION

The present invention relates generally to computerized manipulation of digitized images, and more particularly to a graphical user interface for assisting a user to make desired adjustments in a displayed continuous tone image.

BACKGROUND OF THE INVENTION

PC (personal computer) based graphics software systems are commercially available for professional photographers and other experts in digital imaging. They typically permit the user to increment (or decrement) individual variables such as brightness, contrast, or hue, and to see previews (thumbnails) of a single increment of change in two or more related variables before the selected change is applied to the underlying data. However, many variables can be manipulated on the same screen, the interrelationships between the various variables are not readily apparent, and many combinations of interrelated variables are not previewed. As a result, the novice user is overwhelmed with information and choices that have no apparent relationship to a desired change to the displayed image, Particularly when attempting to edit a color image, a novice user without a basic understanding of color science does not know how to translate a desired improvement in an image into the specific values for the Red, Blue and Green (RBG), or Cyan, Magenta, Yellow and Black (CMYK) parameters corresponding to the input and output signal channels associated with color scanners, color monitors, color printers and other color-oriented electronic devices. Indeed, many users do not realize that Magenta is the opposite of Green, that Cyan is the opposite of Red, and that Yellow is the opposite of Blue.

A general purpose graphical user interface such as Microsoft Windows™ permits the programmer to designate certain portions of the screen as "buttons" which may be selected and operated by positioning and actuating a pointer device such as a "mouse". When the button is so actuated, the user receives an acknowledgment in the form of a visible change to the button's appearance, and the user interface invokes a software process designated by an "icon", text, or other graphics on or adjacent to the button.

However, the known user interface designs for graphics software applications do not provide an intuitive and unambiguous way for the novice user to make a reversible sequence of simple image adjustments such as more blue followed by less blue. As a result, many users of graphics software do not even try to change the color or other tonal characteristic of an image because they fear that they will make the image look worse instead of better.

SUMMARY OF THE INVENTION

In accordance with one aspect of the invention, chromatic adjustments to the overall color balance of the image are presented on one screen and tonal adjustments (such as brightness or contrast) that do not affect the overall color balance are presented on another screen. Preferably, the chromatic adjustments include at least three independent variables each of which can be separately increased or decreased, while the tonal adjustments include at least two independent variables that can be separately increased or decreased. Such a grouping concentrates the user's attention on only two or three adjustments related to a single readily identifiable deficiency in the original image, and thus not only facilitates image improvement but also makes it easier to selectively undo the effects of some adjustments but not others.

In accordance with another aspect of the invention, each adjustment is displayed as a pair of preview images which respectively show the effect of a one step increment or decrement of the associated variable. Preferably, each pair of preview images are clearly separated from all other images on the same screen and are displayed as two adjacent "buttons" either of which can be actuated by the user to effect the displayed result. The step size is preferably adjustable by the user by means of a single control that is effective for all the adjustments on that screen This results in an adjustment mechanism that is reversible and readily understandable, even to the novice user.

In accordance with yet another aspect of the invention, each image adjustment screen includes thumbnail image corresponding to the original image and to the revised image. Preferably, the various thumbnail and preview images correspond to a selected portion of the original image, and Zoom and Pan controls are provided to enable the user to select which portion is to be displayed. Size and position may be used to distinguish between the various preview and thumbnail images displayed on the same screen, with the thumbnail view of the revised image being more prominent than the thumbnail view of the original image, and with the thumbnail view of the original image being more prominent than any of the preview views. This makes the picture the focal point of attention for the user, and gives the user a higher fidelity representation of the final result of the adjustments made in the screen. In contrast, the preview images are merely presented as a mechanism to achieve that result, for example as animated buttons.

DETAILED DESCRIPTION

Figure 1:
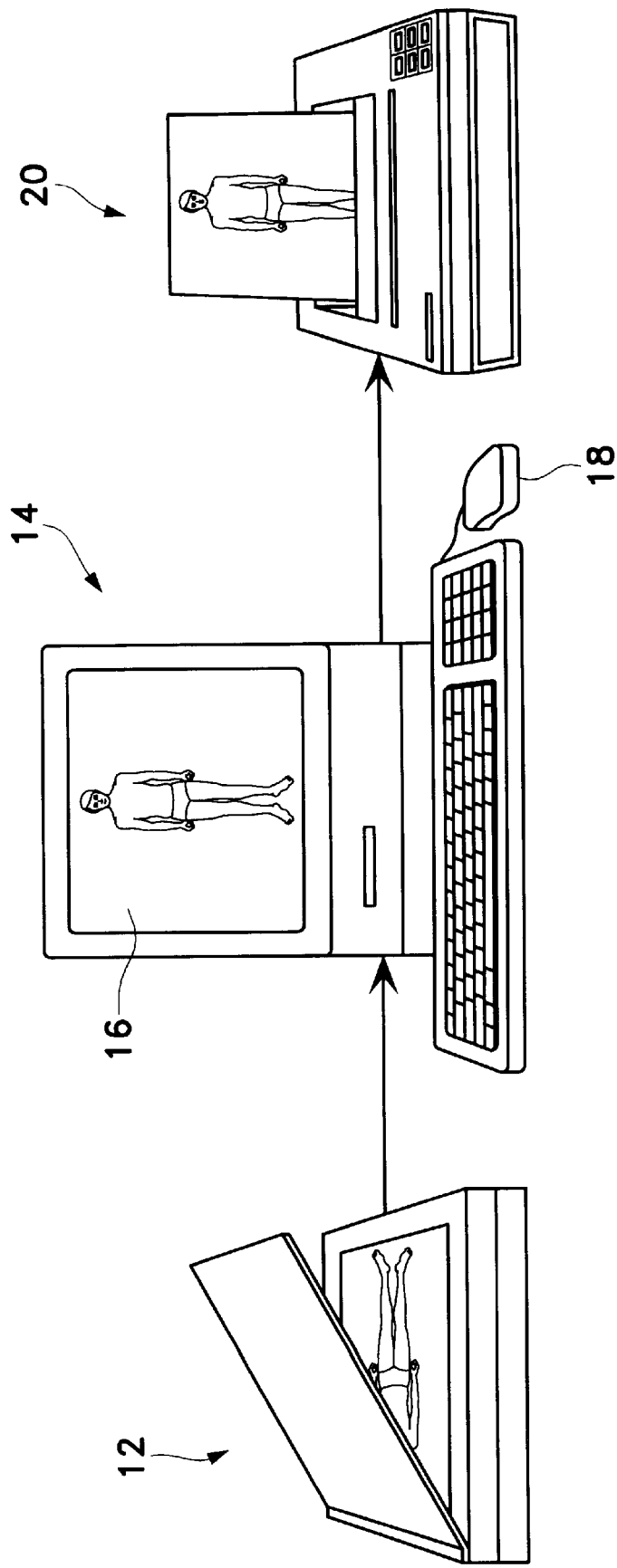
FIG. 1 is a block diagram of a typical PC-based image processing system.

Referring to FIG. 1, it will be seen that a typical PC-based image processing system 10 incorporates a flat bed scanner 12 (or other digital image source), a personal computer 14 (or other digital image processor) with a monitor 16 and mouse 18, and a color ink jet printer 20 (or other output device). Except for certain aspects of the software, to be discussed in more detail hereinafter with respect to FIGS. 2–4, the image processing system may comprise commercially available hardware and software components, assembled in a manner that will be readily apparent to one skilled in the art.

Figure 2:
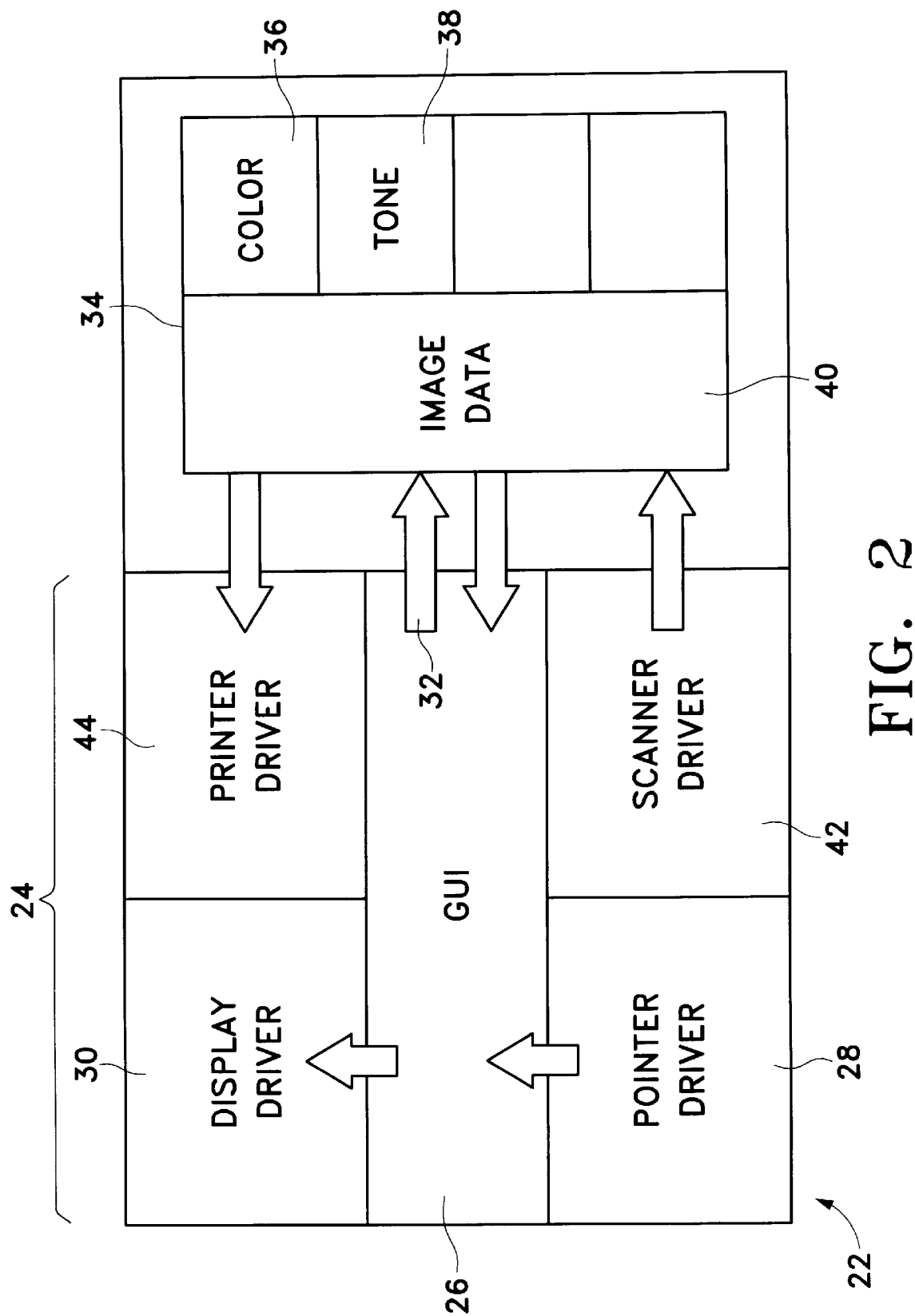
FIG. 2 is a block diagram of various routines associated with a preferred embodiment of the present invention.

In an exemplary embodiment as shown in simplified block diagram form in FIG. 2, the software 22 that controls PC 14 includes an operating system 24 (such as Microsoft Windows 95) having a generic graphical interface 26 whereby the user may use the pointer 18 via a pointer driver 28 to select and operate various controls (such as buttons and sliders) appearing on the screen of the monitor 16 under the control of a display driver 30 thereby generating control signal inputs 32 to an application program such as image processor program 34. The control signals 32 include a first set associated with a chromatic adjustment routine 36: IN, OUT, LARGE, SMALL, BLUE, YELLOW, GREEN, MAGENTA, RED, CYAN, REVERT, and a second set associated with a tonal adjustment routine 38: IN, OUT, LARGE, SMALL, LIGHT, DARK, HIGH LOW and REVERT. Image processor 34 also includes memory 40 for storing in known fashion a thumbnail of the original image (i.e., before the current set of adjustments were applied, but including any previously saved adjustments, as well other corresponding images that incorporate various selected combinations of adjustment steps. Image processor 34 receives image data from scanner 12 via a scanner driver 42 and outputs image data not only to the monitor 16 via the graphics interface 26, but also via printer driver 44 to printer 20.

Figure 3:
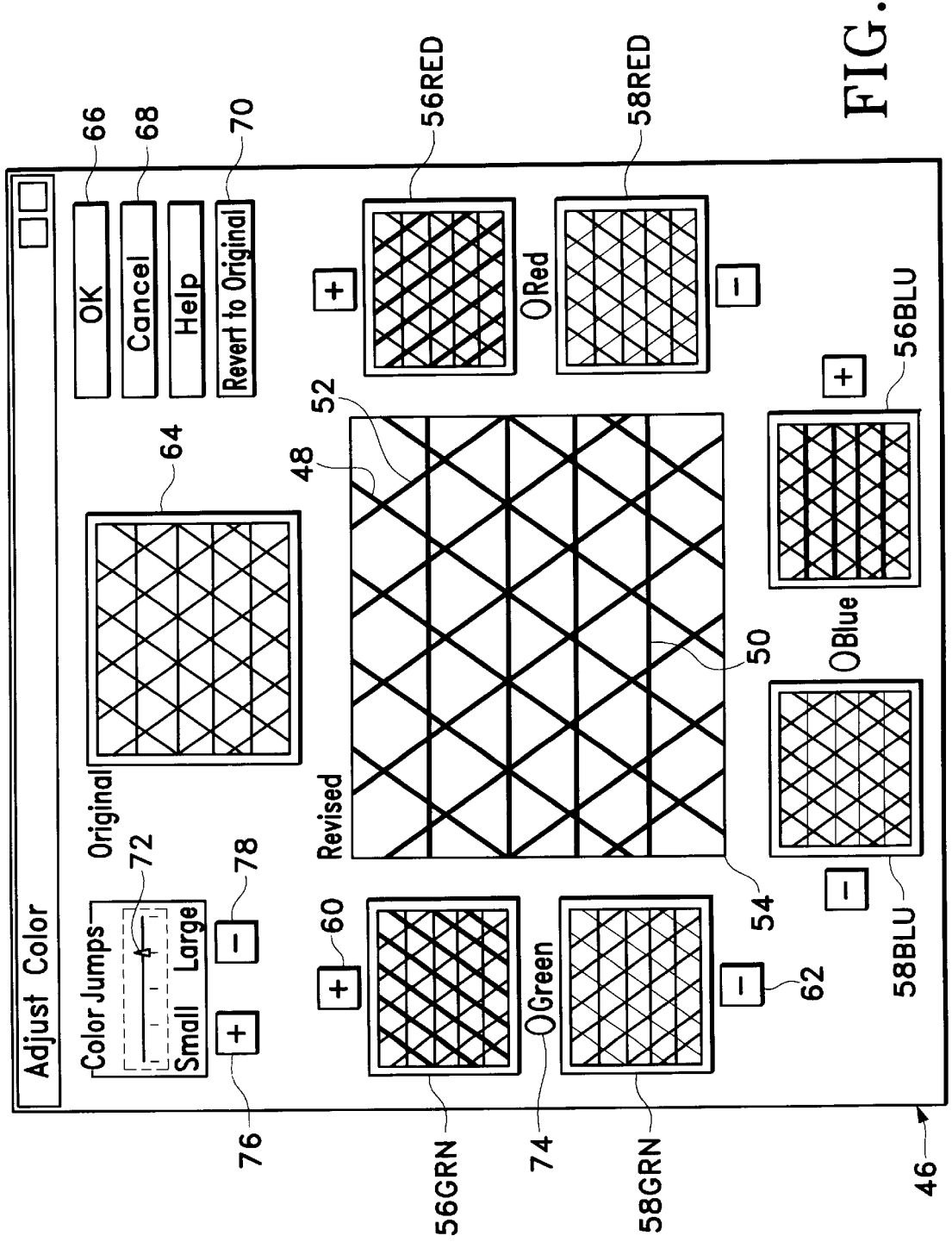
FIG. 3 shows a preferred embodiment of a user interface screen for making chromatic adjustments

Reference should now be made to FIG. 3, which shows a presently preferred embodiment of the control screen 46 associated with color adjustment routine 36. The depicted image is a simple geometric array of colored stripes, with the green stripes 48 extending upwardly from left to right, the blue stripes 50 extending horizontally, and the red stripes 52 extending downwardly from left to right, with the intensity of each color being represented schematically by the width of each stripe. However, it will be appreciated that the principles of the invention are applicable to more complex images formed from many individual pixels, with each pixel including having components selected from three primary colors, with each component capable of assuming many different intensity levels.

At the center of screen 46 is a thumbnail 54 of a selected portion of the image as currently revised, including any prior adjustments. It is the center of the screen 46 and therefor the natural focus of the user's attention. Surrounding the revised thumbnail 54 are six smaller preview images 56Grn 58Grn 58Blu 56Blu 58Red 56Red which display the same image, to which has been tentatively applied a predetermined number (n) of color adjustment steps as follows (counterclockwise starting at the upper left): +n green, −n green, −n blue, +n blue, −n red, +n red.

Note that in color space, Green is the opposite of Magenta and that adding one unit of Green is the same as subtracting one unit of Magenta and vice versa. Similarly, Blue is the opposite of Yellow, and Red is the opposite of Cyan.

To further emphasize and identify the function of each preview image, the preview image 56 associated with a positive increment is provided with a corresponding plus icon 60 on an appropriately colored background and the preview image 58 associated with a negative increment is provided with a corresponding minus icon 62. Both the pair of preview images 56, 58 and the associated plus and minus icons 60, 62 are displayed in the form of button graphics, either of which when selected and operated by the user, causes the revised thumbnail image 54 to incorporate the selected adjustment, whereupon all previews 56, 58 are updated accordingly.

Conventionally, color correction requires manipulation of three independent variables. In accordance with the present invention, the adjustment of each variable is displayed as two side-by-side preview images 56, 58 which respectively show the effect of a one step increment or decrement of that variable. Moreover, each pair of preview images 56, 58 are clearly separated from all other images on the same screen.

Intermediate in size between the Revised thumbnail and the six previews is an Original view 64 of the image as last saved by means of "OK" button 66. The user may exit from screen by means of Cancel button 68. Alternatively, the use may revert to the last saved image as displayed on Original button 64 by either selecting and operating the button on which that image is displayed, or by operating the "Revert to Original" button 70. A slider control 72 is also provided to simultaneously set the current step size from one unit (extreme left) to five units (extreme right), and which is effective for all the adjustments on that screen. Counters 74 are provided to indicate the number of units of each adjustment that have been applied to the original image 64 since it was last saved by means of OK button 66. A pair of conventional zoom controls 76, 78 can be used to select how much of the image is displayed in each of the windows 64, 54, 56, 58. A conventional pan control (not shown) may also be provided to select a portion of the displayed image other than its center.

Figure 4:
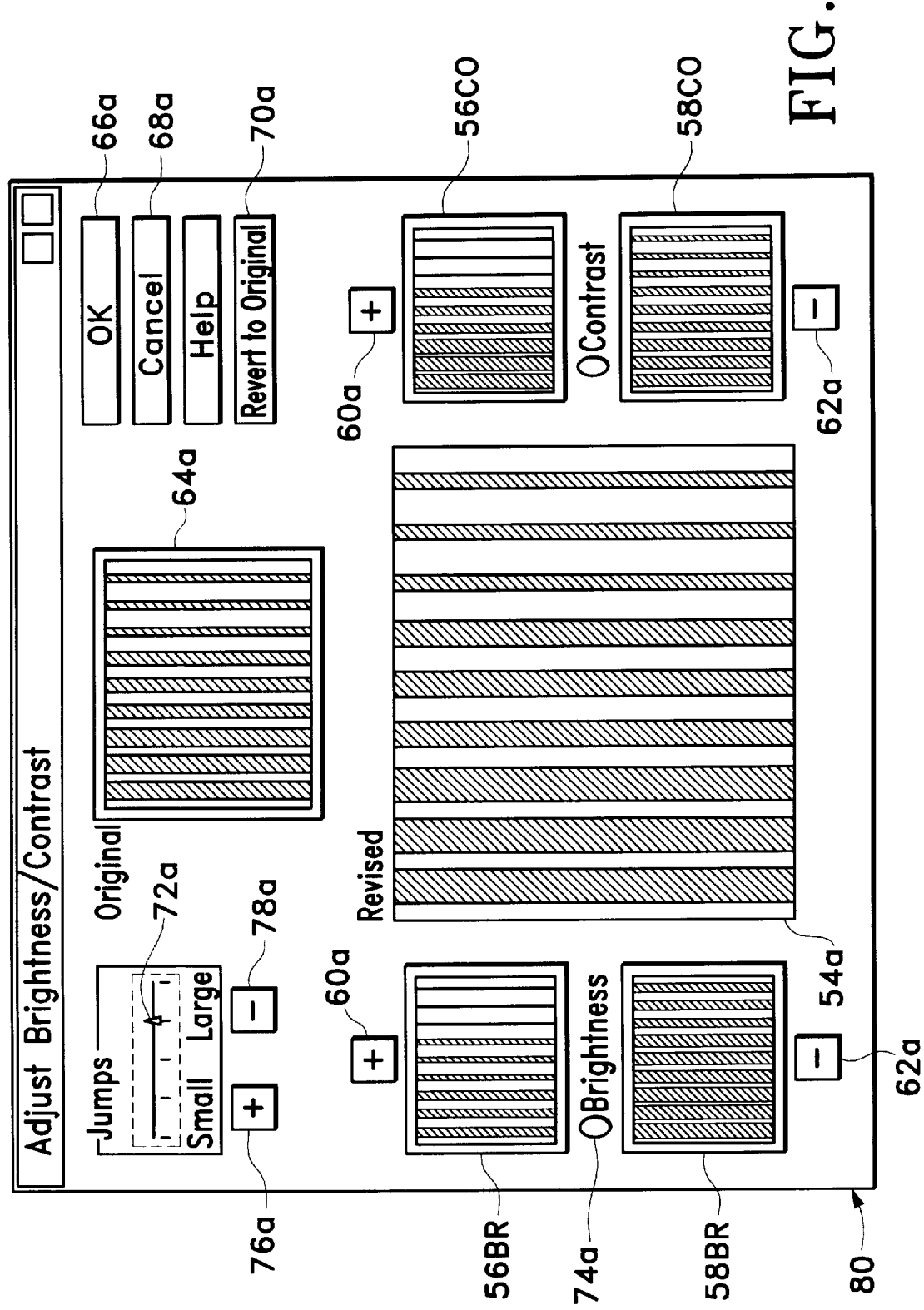
FIG. 4 shows a preferred embodiment of a user interface screen for making tonal adjustments

Reference should now be made to FIG. 4, which depicts a Tonal Control screen 80 implementing similar concepts as used in the design of Color Control screen 46, but applied to only two variable variables, namely Brightness and Contrast. Accordingly, corresponding elements have been identified with the same reference numeral as was used previous, but with the suffix "a", "Br" or "Co". The schematic images are a series of vertical stripes representing an image gradient that is dark on the left and bright on the right, with the width of each stripe representing the tonality of that part of the image, ranging from very dark (left) to very light (right).

Note that the Tonal screen 80 is very similar in arrangement and appearance to Color screen 46, except for the number of paired preview images 56, 58 and associated plus and minus icons 60, 62 (two instead of three). However, the background of the plus and minus icons 60Br, 62Br for the brightness adjustment is solid black, while for contrast icons 60Co, 62Co it is black and white (more contrast 60Co), or dark gray/light gray (less contrast icon 62Co).

Other modifications will be apparent to those skilled in the art. For example, some of the previews 56, 58 could depict only a selected portion of the original image, while the windows 64, 54 could depict the entire image. As another example, the revert button 70 could be programmed to provide more than one undo level.

We claim:

1. An image processing system comprising:

a memory device for storing digital image data, a display device for selectively displaying a plurality of graphical user interface screens to a user, a pointer device for selectively operating control buttons on the displayed graphical user interface screen, and a digital image processor for revising the digital data, wherein at least one of said user interface screens is an adjustment screen for adjusting at least two related variables relating to said revised image, said adjustment screen includes a thumbnail view of a revised image derived from the stored digital image and a respective pair of preview views for each of the related variables, the graphical user interface screen displays each said pair of preview views as two side-by-side images which respectively represent the application of an increment or decrement of the respective variable to the revised image, each pair of preview views is spatially separated from all other preview views on the same screen, each of the preview views is displayed on a respective preview control button, and when one of the control buttons is selected and operated, the image processor applies the respective increment or decrement to the revised image, and updates the displayed thumbnail view and all of the displayed preview views to incorporate the applied increment or decrement.

2. The system of claim 1, wherein the adjustment screen further includes a slider control for determining the size of a single increment or decrement.

3. The system of claim 1, wherein the adjustment screen further includes a counter for accumulating how many steps each variable has been incremented or decremented since the revised image was stored in the memory device.

4. The system of claim 3, wherein each counter is labeled with the name of a respective variable.

5. The system of claim 1, wherein each preview view is identified by a icon representing a respective variable and whether it is being incremented or decremented.

6. The system of claim 5, wherein each icon is displayed on a respective icon control button.

7. The system of claim 6, wherein the operation of an icon control button has the same effect as operation of a respective preview control button.

8. The system of claim 1, wherein the original image is displayed on a control button which when operated causes the revised image displayed on the thumbnail view to revert to the stored digital image.

9. The system of claim 1, wherein the thumbnail image is larger than any of the preview images.

10. The system of claim 1, wherein each pair of preview images is located on a different edge of the thumbnail image.

11. The system of claim 1, wherein the adjustment screen further includes an original thumbnail view corresponding to the stored digital image.

12. The system of claim 11, wherein the thumbnail view of the revised image is larger than the thumbnail view of the original image.

* * * * *